OR 3,569,714

[11] 3,569,714

| | | | |
|---|---|---|---|
| [72] | Inventors | Charles G. Anderson, Carlisle; Vincent L. Avona, Bellbrook; Donald P. Kelly, Kettering, Ohio | |
| [21] | Appl. No. | 876,932 | |
| [22] | Filed | Nov. 14, 1969 | |
| [45] | Patented | Mar. 9, 1971 | |
| [73] | Assignee | The United States of America as represented by the United States Atomic Energy Commission | |
| [54] | PROTECTED RADIOISOTOPIC HEAT SOURCE 7 Claims, 2 Drawing Figs. | | |
| [52] | U.S. Cl. | | 250/108, 250/106 |
| [51] | Int. Cl. | | G21f 1/00 |
| [50] | Field of Search | | 250/106 (S), 106 (R), 108 (WS), 108 (R) |

[56] References Cited
OTHER REFERENCES

Sr[90] Powers an Automatic Weather Station by Kershaw Nucleonics Nov. 1962 pp. 92—97

*Primary Examiner*—James W. Lawrence
*Assistant Examiner*—D. Nelms
*Attorney*—Roland A. Anderson ABSTRACT: A radioisotopic heat source including a container with plurality of closed chambers cooperating to preserve integrity of the contained radioactive heat source against impacts, projectiles, extreme temperatures, and other various environmental conditions pertaining to missiles for carrying the heat source into outer space and landing it on the moon.

PATENTED MAR 9 1971

3,569,714

INVENTOR.
CHARLES G. ANDERSON
VINCENT L. AVONA
DONALD P. KELLY

BY 3,569,714

PROTECTED RADIOISOTOPIC HEAT SOURCE

BACKGROUND OF INVENTION

There is considerable interest in learning scientific facts about the nearby planets and specifically about the Earth's moon. In the recent Apollo 11 flight to the moon, electronic equipment was placed on the moon to detect seismic disturbances to gain information about such phenomena as meteoroid impacts, free oscillations, and surface tilt tidal deformations caused by external gravitational fields acting on the moon.

Since one of the problems encountered in the operation of such seismic electronics package is that the equipment may be placed at a location near the terminator between the "light" and "dark" sides of the moon which experiences both lunar days, and lunar nights, during which the temperature may fall below −300° F. (−184° C.), a heat source should be provided so that such cold temperatures do not objectionably impair the operation of the electronics and to stretch the effective operative lifetime.

In order to maintain integrity of the heat source "package" in the event of accidents imposing mechanical and physical stresses and strains upon it, provision are made to contain the radioisotopic material. These stresses and strains, for example, could be encountered in the event of accidental conditions of impact, explosion, and heat encountered before, during, of after the launch of a space vehicle carrying the device. Additionally, in the event of an abort from space in which the heat source would fall back to Earth, the heat source container should be able to withstand heat and stresses of reentry into the atmosphere and subsequent impact with the Earth to maintain the integrity of the radioactive source material to minimize release of radioactive materials.

BRIEF DESCRIPTION OF THE INVENTION

In light of the above, it is, therefore, an object of the invention to present a radioisotope heater to provide heat to electronics which may be exposed to extremely cold temperatures and the container of which will maintain the integrity of the radioactive heat source material under conditions of impact, explosion, and heat that might be encountered before, during, or after the launch of a space vehicle.

These and other objects, features and advantages of the invention will become apparent to those skilled in the art from the following detailed description when read in conjunction with the attached drawing and appended claims.

In accordance with the present invention, a radioisotopic heat source suitable for maintaining desire d temperature in cold environments, such as would be encountered on the moon during the lunar night, and in which the radioactive heat source material is protected from external shocks, impacts, stresses, and heat which may be encountered during accidental conditions is presented. The heat source includes a plurality of chambers, each chamber performing a predetermined desired function. The first and innermost of the chambers contains the radioactive heat source, the second chamber provides a container free of surface radioactive contamination, the third chamber presents an oxidation barrier to the refractory metals of the other chambers, the fourth chamber adds physical and chemical strength to the first three chambers to maintain the integrity of the radioactive source under any physical stress or under the influence of fragments of projectiles likely to be encountered in space vehicle or missile accidents, the fifth chamber presenting a heat insulating surface, the sixth chamber presenting a heat ablative material which will burn off in the event of a reentry into the Earth's atmosphere, and the seventh chamber being an overall mounting container to hold and maintain the first six chambers in a predetermined configuration or arrangement.

BRIEF DESCRIPTION OF THE DRAWING

Illustrated in FIGS. 1 and 2 of the accompanying drawings are a cross-sectional assembled view, and an exploded perspective view showing particularly the interrelationship of the parts.

In the drawings, various dimensions and sizes of the illustrated parts have been exaggerated for purposes of clarity illustration, and for ease of description.

DETAILED DESCRIPTION OF THE PREFERRED EMBODIMENT

Figure 1:
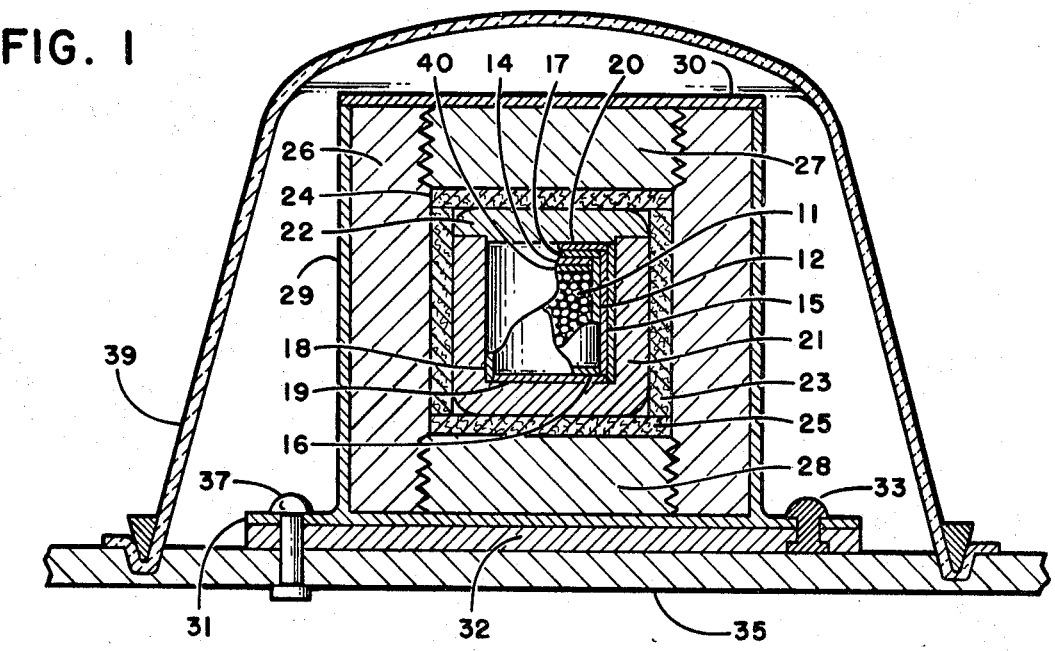
Figure 2:
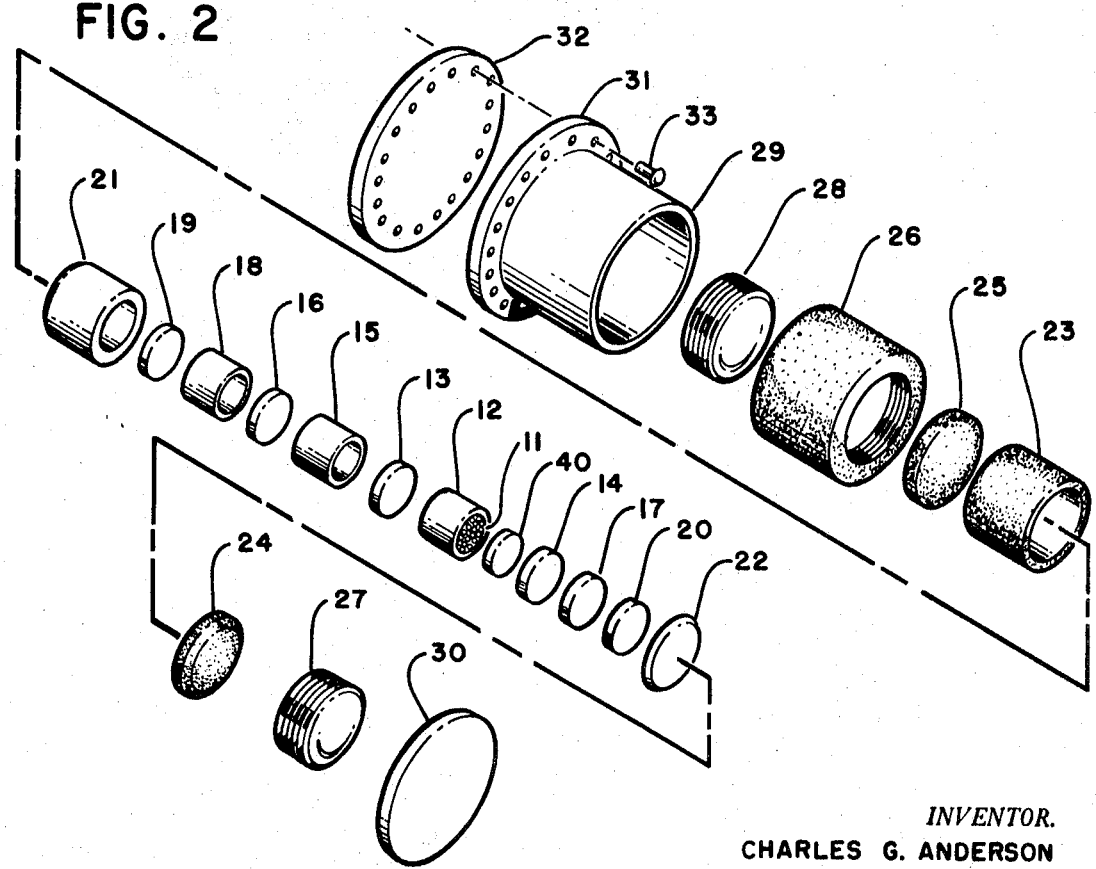

The preferred embodiment of the radioisotopic heater "package" denoted generally by the reference numeral 10 in the drawings, includes seven concentric containers, each defining therewithin an interior chamber, and performing a desired function. The containers are illustrated and described herein as being cylindrical in shape, but others presenting a closeable chamber configuration may be used depending on reentry, heat transfer and mechanical requirements; for example, a container of box shape, spherical shape, or the like may be employed where appropriate. It has been found, however, that the illustrated right circular cylindrical shape, in which the heater and container heights are approximately equal to their diameters, is optimum considering all parameters. Within the shown concentric containers is a radioactive heat source material 11. Although the particular radioactive heat source material utilized depends, in part, upon the amount of heat desired and the amount of allotted space for the entire heater, a quantity of about 37.6 grams of $^{238}PuO_2$ plasma fired microspheres having a $^{238}PuO_2$ content of approximately 70.7 weight percent (the other 29.3 percent being primarily $^{239}PuO_2$), with an apparent density of about 10.14 grams per cubic centimeter, and with less than 0.44 weight percent total impurities has been found suitable to provide a power of about 15 thermal watts. Such $^{238}PuO_2$ micospheres may be made with any conventional forming process such as the process described in U.s. Pat. No. 3,171,714 issued Mar. 2, 1965 to a Method of Making Plutonium Oxide Spheres. The radioactive heat source material 11 is enclosed within a first container or inner liner 12 and its respective end caps 13 and 14. First container 12 may be of a tantalum-10 weight percent tungsten alloy, and have a wall thickness of 20 mils (0.051 cm.), for ease of fabrication. The end caps 13 and 14, of similar thickness, may be welded to container 12 by a tungsten inert gas welding method, such method being well known in the art. To prevent blowout of heated gases through the molten metal of the first container 12 during the welding process to attach end caps 13 and 14 a shim 40 may be provided, Shim 40 may be of any material compatible with the radioactive heat source 11, and, for $^{238}PuO_2$, may be suitably made of tantalum-10 weight percent tungsten alloy. To provide an overall container free of surface radioactive contamination, a second container or outer liner 15 may be provided with end caps 16 and 17 tungsten inert gas welded to the first container 12. Container 15 and its end caps 16 and 17 may also be of tantalum-10 weight percent tungsten alloy of thickness about 20 mils (0.051 cm.). Although containers 12 and 15 have been described as being of tantalum-10 weight percent tungsten alloy, they may be of any material generally inert with respect to plutonium or other heat source material; however, it has been found that the tantalum-10 weight percent tungsten alloy is particularly compatible with $^{238}PuO_2$ heat source material at operating temperatures.

A third container or clad 18 with its end caps 19 and 20 is provided to present an oxidation barrier for the refractory metal container in the outer containers, below described. Again, container 18 may be of any material; however, it has been found that a 10 mil (0.025 cm.) thick platinum-10 weight percent rhodium is particularly suitable.

The forth container or high strength shell 21 provides mechanical strength and a fragmentation shield to protect against chemical and physical elements encountered in the event of a launch pad explosion, or a terminal velocity impact. The fourth container 21 may be of wall thickness larger than that of the inner three containers, for example, of approximately 0.25 inches (0.63 cm.), and may be made of titanium, a material with a relatively high strength and low density. Forth container 21 may be U-shaped in cross section, if desired, to increase its isolation of the radioactive heat source material, thus requiring only one end cap 22 of thickness and material similar to fourth container 21. End cap 22 may be tungsten inert gas welded to fourth container 21 to assure a tight, leak free, continuous seal.

Surrounding and insulating the inner four containers 12, 15, 18 and 21 from any heat generated during reentry into the atmosphere in the event of abort form space is a fifth insulating container 23. Since heat from the radioisotopic heat source is produced in a slow, continuous manner, the insulator does not materially interfere with its normal operation. Fifth container 23 does, however, prevent instantaneous reentry heat or other high temperature excursions from reaching the titanium fourth container 21 thus assuring that the fourth container 21 will present substantially its entire mass upon impact with the Earth to fully protect the integrity of the radioactive heat source. The fifth insulating container 23 may be of fibrous graphite or the like of about 0.150 inch (3.810 cm.) thickness, and may have affixed thereto end caps 24 and 25 of similar fibrous graphite material of approximately the same thickness as fifth container 23. Surrounding and fully encapsulating the first five containers 12, 15, 18, 21 and 23 is an ablative heat shield container 26 with end caps 27 and 28 threaded to securely fasten to interior threads of heat shield 26 to securely encapsulate the enclosed five containers. Heat shield 26 and its respective end plugs 27 and 28 may be of a graphite, a material having a relatively high tensile strength and product uniformity with a thickness of about 0.6 inch (1.52 cm.).

Finally, the entire assemblage, contained within and including the graphite heat shield 26, is contained within a seventh container 29 of stainless steel, of perhaps about 0.030 inch (0.076 cm.) thickness, having an end cap 30 welded thereto. Seventh container 29, may have an annular or otherwise shaped flange 31 about a bottom portion there of to allow the heater of the invention to be affixed to the electronics or apparatus to be heated. The heat generated by the source 10 may be transferred to the electronics or apparatus to be heated, for example, by riveting the heater assembly 10 to an aluminum base plate 32 by rivets 33 or the like and to an apparatus 35 by bolts 37. Base plate 32 may be suitably shaped and made of any other appropriate material to provide good heat transfer between heat source 10 and the apparatus to be heated.

The above combination of inner and outer liner containers 12 and 15, clad container 18, fragmentation shield container 21, insulator container 23, heat shield container 26, and outer container 29 combine and coact together with heat source material 11 to provide a complete heat source assembly which is capable of withstanding extreme environmental conditions. These environmental conditions may occur during and after launching of the rocket vehicle carrying the heat source or during some form of reentry into the Earth's atmosphere to impact against the Earth's surface. Such environmental conditions may typically include impact pressures as high as 1100 p.s.i. or greater, fireballs as high as about 5000° F. for 10 second, accelerations as high as 14 G or more, and vibrations ranging from about 5 to 2,000 Hz. at amplitudes up to 10 G for periods lasting up to 15 minutes. Such a heat source assembly may produce about 15 thermal watts with a decrease of less than 1 percent per year with a maximum heat source assembly weight of about 3 pounds. Such a heat source assembly may be less than 3 inches in diameter with a height of less than 3 ¼ inches.

Addditional insulation or reflective materials 39 may be disposed about container 29 and suitably affixed to apparatus 35 to help maintain the flow of the heat to the apparatus. Such materials may include one or more layers of polyethylene terephthalate with the outer layer coated with a metallic reflector.

Although the invention has been described and illustrated with a certain degree of particularity, it is understood that the present disclosure is made by way of illustration only and that various modifications and changes will become apparent to those skilled in the art without departing from the spirit and scope of the invention.

We claim:

1. A radioisotopic heater for carrying a radioactive heat source material and protecting the same from extreme environmental conditions of impact, explosion, heat, and chemicals comprising; a first container for containing said radioactive heat source material, a second container enclosing said first container for assuring a complete enclosure of said radioactive heat source material, an oxidation barrier cladding container enclosing said second container, a fragmentation shield container enclosing said oxidation barrier container for providing physical and chemical strength to sad heater, a high temperature insulator container enclosing said fragmentation shield container, an ablative heat shield container enclosing said high temperature insulator container, an outer closure container enclosing all of said other containers, and means including a heat conducting plate secured to another surface of said outer closure container for contacting a utilization device and transferring heat from said containers to said utilization device.

2. The heater of claim 1 wherein said first and second containers are of tantalum-10 weight percent tungsten, said oxidation barrier container is of platinum-10 weight percent rhodium; said fragmentation shield container is of titanium; said high temperature insulator container is of fibrous graphite; said ablative heat shield container is of graphite; said outer closure container is of stainless steel; and said heat conducting plate is of aluminum.

3. The heater of claim 1 wherein said ablative heat shield has a wall thickness no less than that of the combined wall thicknesses of said fragmentation shield and said high temperature insulator.

4. The heater of claim 1 wherein said fragmentation shield container is of generally U-shaped cross section with an end cap cooperating therewith.

5. The heater of claim 1 wherein the radioactive heat source comprises plutonium oxide microspheres.

6. The heater of claim 1 wherein said containers are right circular cylinders.

7. The heater of claim 6 wherein said containers have diameters about equal to height.